No. 860,493. PATENTED JULY 16, 1907.
J. J. PUTNEY.
COMBINED POTATO CUTTER AND PLANTER.
APPLICATION FILED DEC. 5, 1905.

5 SHEETS—SHEET 1.

Witnesses
Howard D. Orr
J. F. Riley

Inventor,
John J. Putney
By E. G. Siggers
Attorney

THE NORRIS PETERS CO., WASHINGTON, D. C.

No. 860,493. PATENTED JULY 16, 1907.
J. J. PUTNEY.
COMBINED POTATO CUTTER AND PLANTER.
APPLICATION FILED DEC. 5, 1905.

5 SHEETS—SHEET 3.

Witnesses
Howard D. Orr.
J. F. Riley

John J. Putney, Inventor,
By E. G. Siggers.
Attorney

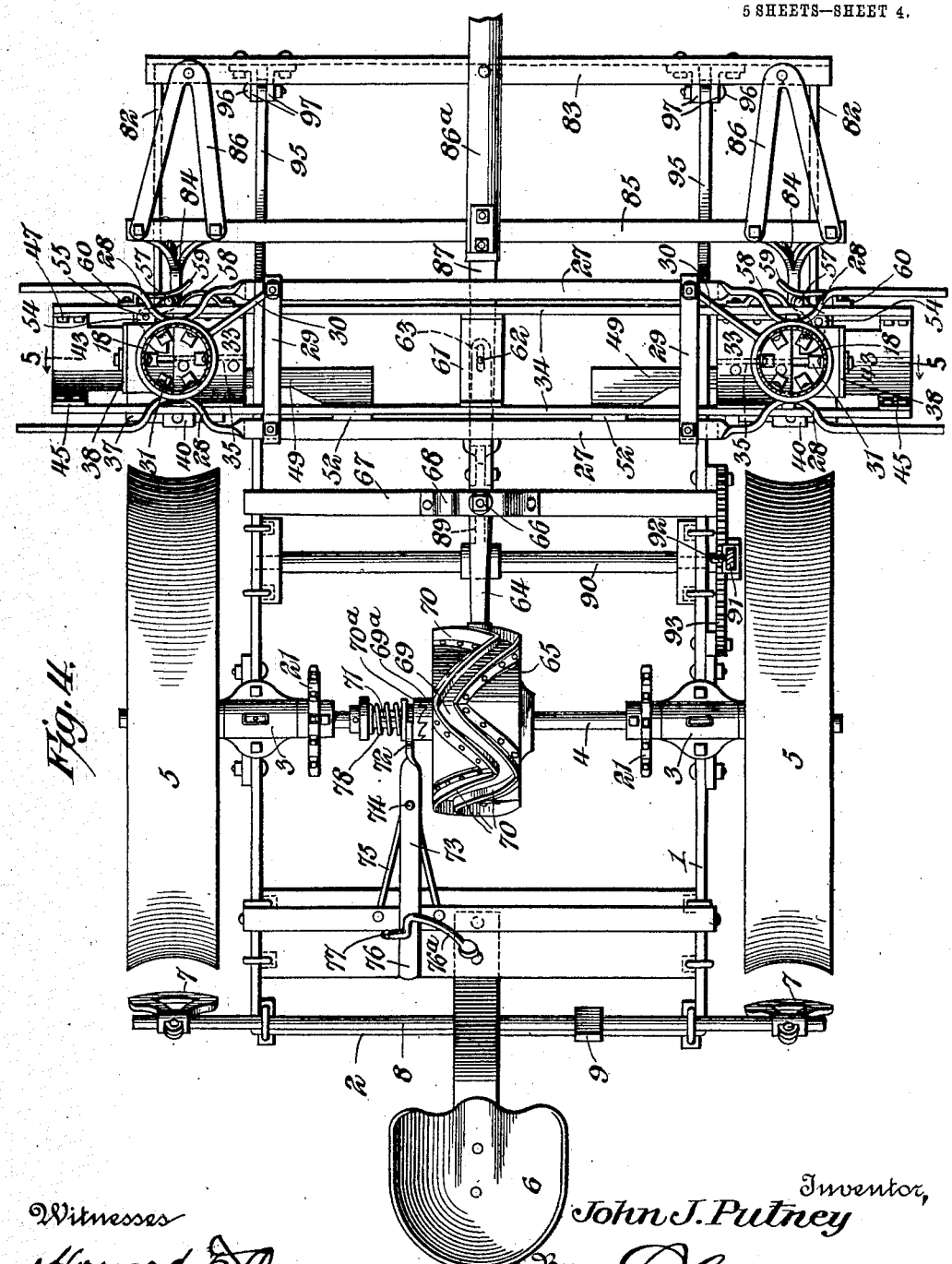

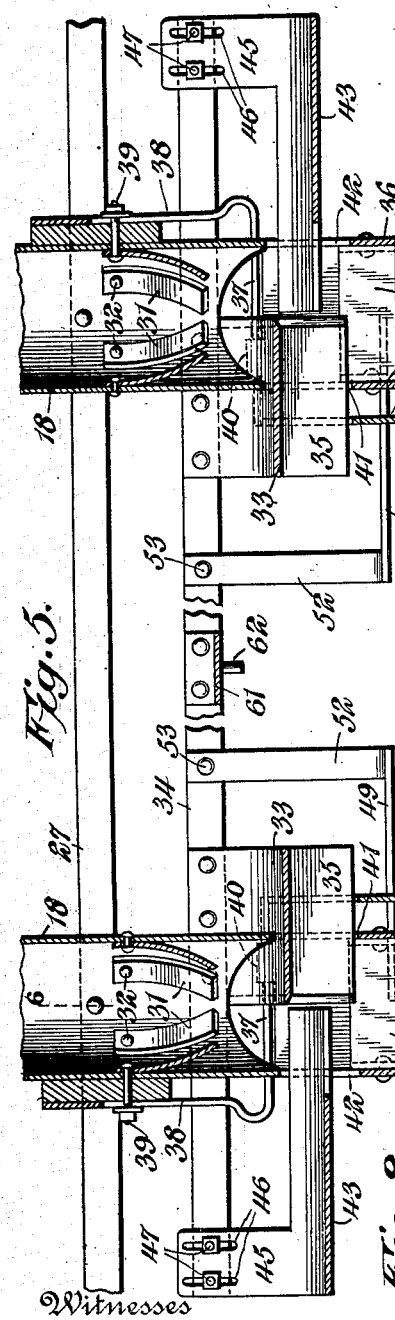

UNITED STATES PATENT OFFICE.

JOHN J. PUTNEY, OF STUART, IOWA.

COMBINED POTATO CUTTER AND PLANTER.

No. 860,493.   Specification of Letters Patent.   Patented July 16, 1907.

Application filed December 5, 1905. Serial No. 290,438.

*To all whom it may concern:*

Be it known that JOHN J. PUTNEY, a citizen of the United States, residing at Stuart, in the county of Guthrie and State of Iowa, has invented a new and useful Combined Potato Cutter and Planter, of which the following is a specification.

The invention relates to improvements in potato cutters and planters.

The object of the present invention is to improve the construction of potato cutters and planters, and to provide a simple and comparatively inexpensive machine designed for planting two rows of potatoes, and adapted to cut a potato and drop one or two portions or seeds in each hill, and capable of enabling the actuating mechanism for the cutting and planting means to be changed for controlling the speed of the same and the distance between the hills.

With these and other objects in view, the invention consists in the construction and novel combination and arrangement of parts, hereinafter fully described, illustrated in the accompanying drawings, and pointed out in the claims, hereto appended; it being understood that various changes in the form, proportion, size, and minor details of construction, within the scope of the claims, may be resorted to without departing from the spirit or sacrificing any of the advantages of the invention.

Figure 1:
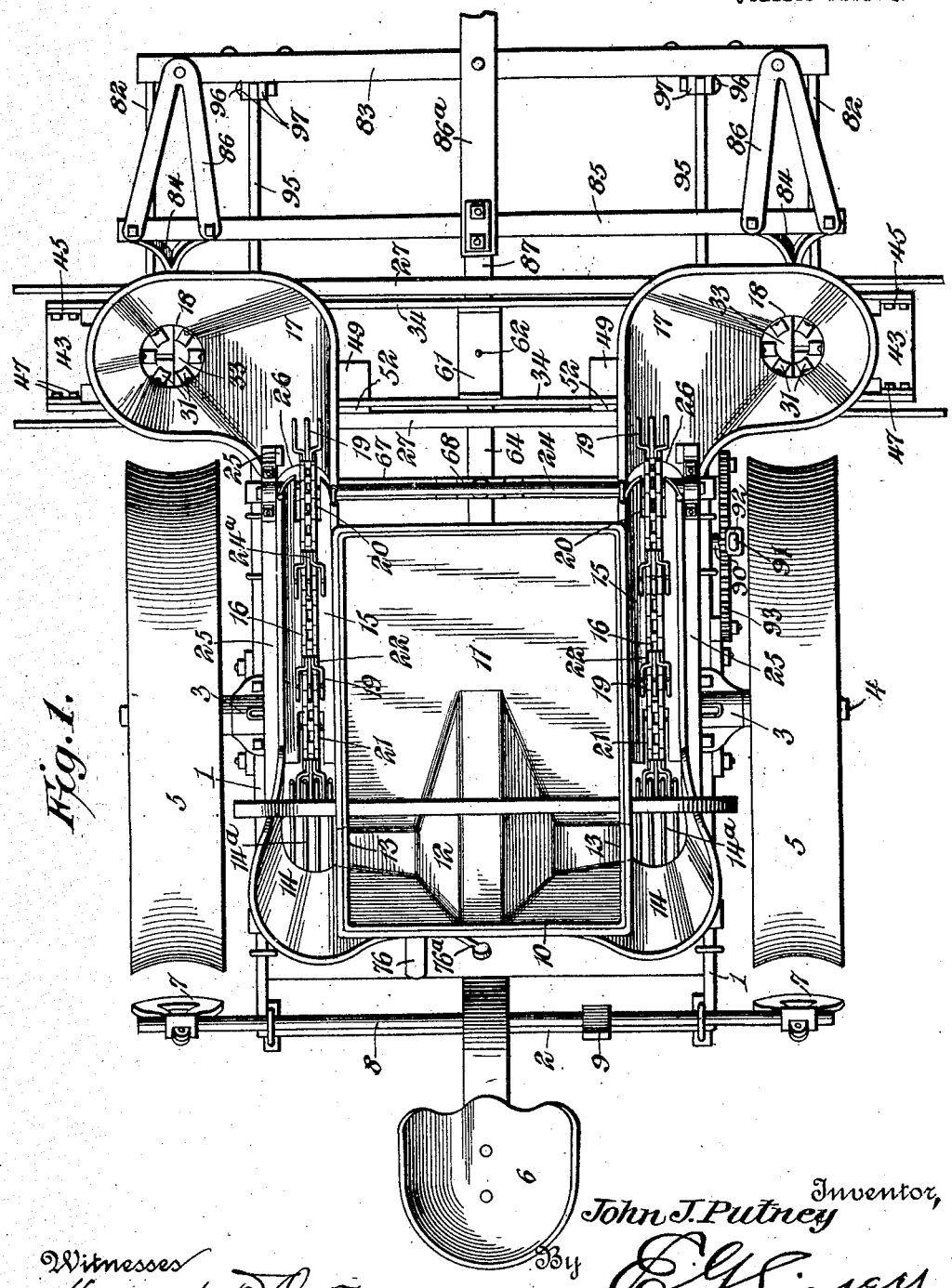
Figure 2:
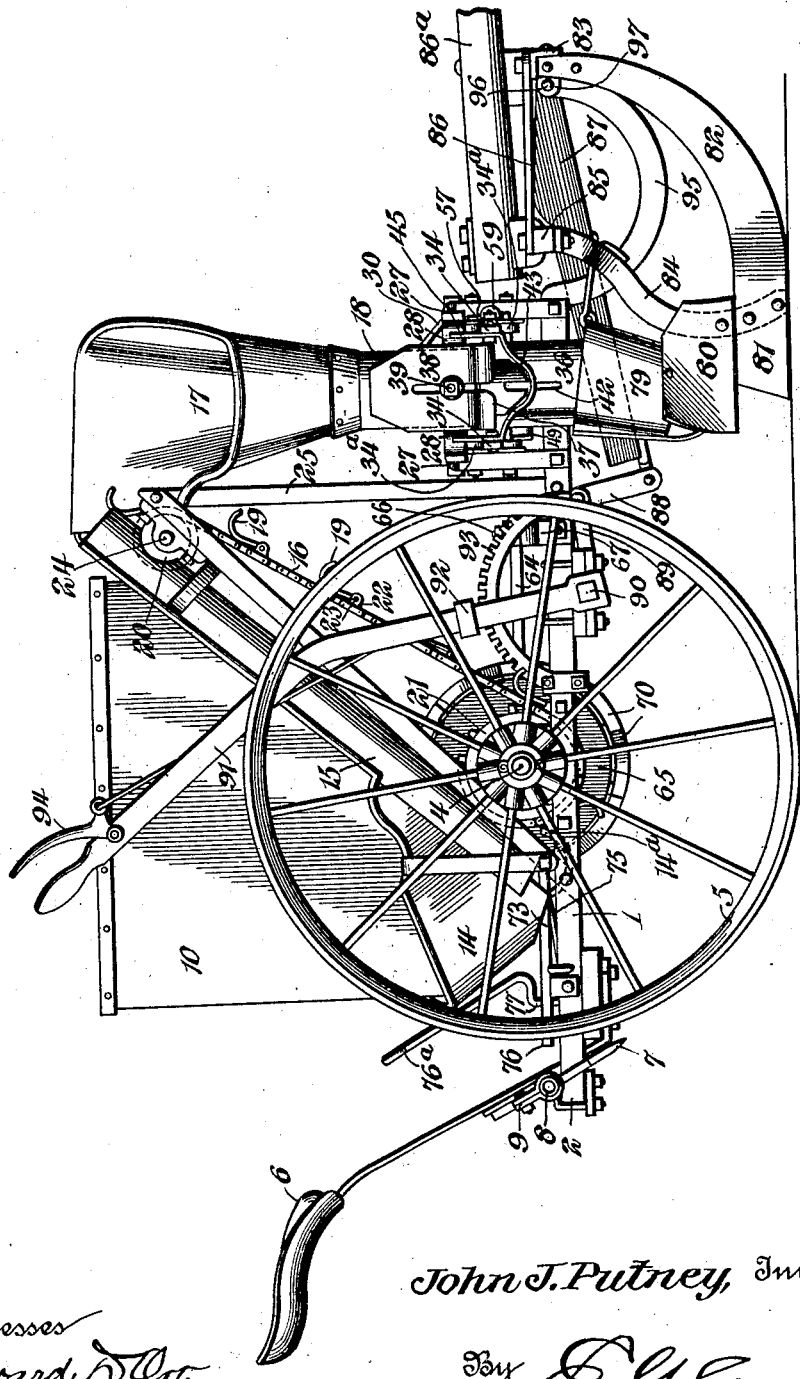
Figure 3:
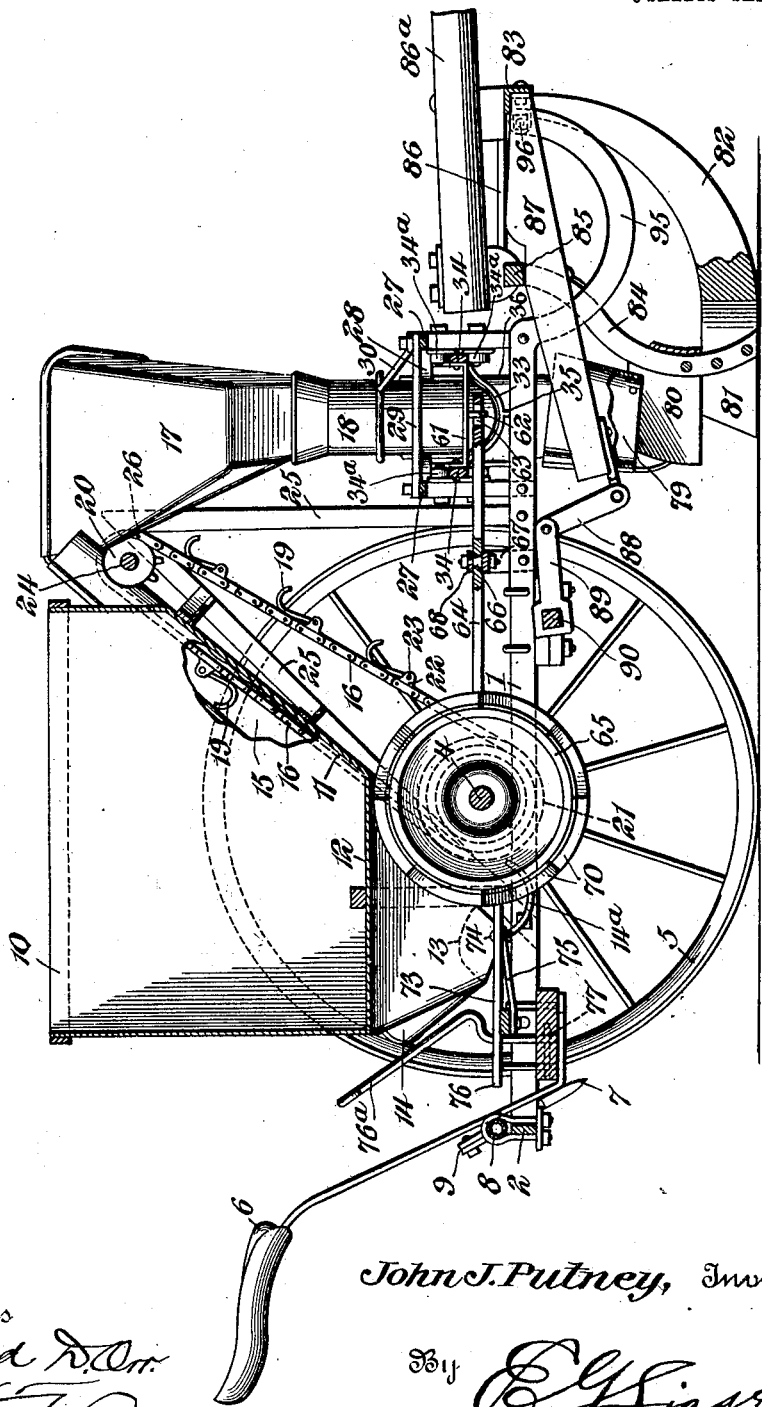

In the drawings:—Figure 1 is a plan view of a potato cutter and planter, constructed in accordance with this invention. Fig. 2 is a side elevation of the same. Fig. 3 is a longitudinal sectional view. Fig. 4 is a plan view, the hoppers and the inclined endless conveyers being removed. Fig. 5 is an enlarged detail transverse sectional view taken substantially on the line 5—5 of Fig. 4. Fig. 6 is a detail sectional view taken substantially on the line 6—6 of Fig. 5. Fig. 7 is a reverse plan view of one of the mechanisms for cutting and dropping the potatoes. Fig. 8 is a detail perspective view of one of the links of the endless conveyers. Fig. 9 is a detail perspective view of one of the hook-shaped potato carriers. Fig. 10 is a detail perspective view of the kicker.

Like numerals of reference designate corresponding parts in all the figures of the drawings.

1 designates a main frame, having parallel side bars and provided with a rear transverse bar 2, which connects the side bars, and which is preferably formed integral therewith, but the main frame may be constructed in any other desired manner, as will be readily understood. The side bars, which are also connected at suitable intermediate points by transverse bars or braces, is provided at opposite sides with bearings 3, for the reception of a transverse shaft or axle 4, to which are secured combined carrying and covering wheels 5, which are provided with concave peripheries for covering the potatoes after the same have been dropped into the furrows, as hereinafter explained. A seat 6 is mounted on the rear portion of the main frame for the accommodation of the driver, and suitable scrapers 7 are arranged for cleaning the wheels 5. The scrapers 7, which have convexly curved edges for engaging the peripheries of the combined carrying and covering wheels, are mounted on and depend from the ends of a transverse shaft or pintle 8, having an arm 9 adapted to be engaged by the foot of the operator for throwing the scrapers into and out of engagement with the wheels 5.

Mounted upon the supporting frame is a main hopper 10, constructed of sheet metal or other suitable material and extending in rear of the transverse shaft or axle 4, as clearly illustrated in Figs. 2 and 3 of the drawings, and having its front wall 11 inclined at the lower portion for directing the potatoes towards the back of the hopper 10. The hopper 10 is provided with an oppositely-inclined bottom 12, the inclined portions extending downward and outward from the median line of the bottom for directing potatoes towards lateral openings 13, through which the potatoes pass to rear side hoppers 14. The side hoppers 14, which are constructed of sheet metal or other suitable material, are secured to the exterior of the main hopper 10, and are arranged at the lower ends of inclined conveyer casings 15, in which operate endless conveyers 16. The inclined conveyer casings or frames are substantially semi-cylindrical and have their upper ends arranged adjacent to a pair of front chutes 17, which receive the potatoes and deliver the same to front hoppers 18. The endless conveyers 16 consist of endless chains, provided at intervals with hook-shaped carriers 19 and arranged on upper and lower sprocket wheels 20 and 21. The links of each endless conveyer is provided at intervals with projecting eyes 22, which receive pintles 23, and the latter also pass through eyes 24ª of the hook-shaped carriers 19. The hook-shaped carriers may be arranged at any desired intervals for feeding the potatoes with the desired rapidity to the chutes at the front of the machine. The lower sprocket wheels 21 are mounted on the transverse shaft or axle 4 at opposite sides thereof, and the upper sprocket wheels or pinions are keyed or otherwise secured to an upper transverse shaft 24, which extends across the front of the machine, and which is journaled in suitable bearings of opposite approximately inverted V-shaped standards 25. The inverted V-shaped standards 25 consist of upright front bars or portions and inclined rear bars or braces, as clearly shown in Figs. 2 and 3 of the drawings.

When the machine moves forward, the rotary movement of the carrying wheels 5 is communicated to the lower sprocket 21, and the conveyer 16 carry the potatoes upward from the rear side hoppers and discharge them into the chutes 17. The chutes 17 extend outward laterally of the machine to the front hoppers 18, and they are provided with inclined bottom walls for directing the potatoes to the said hoppers 18. The rear walls of the chutes 17 are provided with suitable slots 26, through which the tines or fingers of the hook-shaped carriers pass after they have discharged the potatoes. The rear side hoppers are also provided at their bottoms with openings for the passage of the fingers or tines of the hook-shaped potato carriers, and the bottoms of the said rear hoppers are preferably formed by means of spaced rods or fingers 14$^a$ suitably secured at their rear ends to the rear walls of the rear side hoppers and extended forwardly therefrom and curved as shown. These curved rods, which are substantially semi-circular, provide baskets at the bottoms of the side hoppers for holding the potatoes. The upper stretch of the inclined conveyer operates in the inclined frame or casing 15, and the hook-shaped carriers move upward in the same, and swing forward at the upper ends of the frame or casing, so that the potatoes are discharged into the front chute 17, and the other stretch of each conveyer is located in advance of and beneath the frame or casing 15.

The front hoppers 18 are arranged between and are supported by a pair of fixed transverse bars 27, which are suitably secured to the side bars of the supporting frame, and which are provided beyond the same with inwardly extending curved portions 28, located in advance and in rear of the front hoppers 18, and riveted or otherwise secured to the same. The front hoppers, which are located beyond the side bars of the main frame, are directly in advance of the wheels 5, which cover the potatoes as they are cut and dropped from the front hoppers. The fixed transverse bars 27 are connected adjacent to the side bars of the supporting frame by short longitudinal bars 29, and the front hoppers are braced by diagonally arranged rods 30 extending outwardly and rearwardly from the front ends of the bars 29 to the inner sides of the front hoppers, as clearly shown in Fig. 4 of the drawings.

Within each front hopper is arranged an annular series of springs 31, inclined downwardly and inwardly and converging towards the center of the bottom of the hopper and riveted or otherwise secured at their upper ends 32 to the walls of the front hoppers at regular intervals. The lower free ends of the springs 31 center and form resilient supports for a potato for holding the same in position to be cut by knives or cutters 33. The knives 33 are carried by a pair of laterally reciprocatable bars 34, which slide between upper and lower antifriction rollers 34$^a$, see Fig. 3, and the said knives consist of upper substantially horizontally disposed curved portions and depending vertical portions 35, as clearly illustrated in Fig. 6 of the drawings. The tubular front hoppers have their lower ends rounded, as clearly shown in Fig. 6 of the drawings, and the upper curved portions of the knives or cutters are adapted to cut a potato in half, and the depending vertical portions 35 are adapted to cut vertically and divide the lower half of a potato into quarters.

Beneath each front hopper is arranged a substantially rectangular box or casing 36, which is hung from and supported by a hanger 37, having opposite side portions connected at their inner ends by a depending transverse portion 37$^a$ and at their outer ends by an upwardly extending arm 38, which is adjustably secured to the outer side of the adjacent front hopper. The upwardly extending arm 38 see Fig. 5 of the hanger 37 is provided with a slot through which a bolt 39 passes which also pierces the outer side wall of the front hopper, and which secures the hanger in its adjustment. The front and rear walls of the rectangular box or casing 36 are provided with substantially U-shaped arms 40, which embrace the side portions of the hanger 37, and which are riveted or otherwise secured to the same. The inner and outer walls of the box or casing 36 are provided with slots 41 and 42 to afford a passage for the depending vertical portion 35 of the blade or cutter 33, and the upper edges and the inner and outer sides are recessed and concavely curved to afford a passageway for the upper portion of the knife or cutter and for an outer slide 43, which is located below and spaced from the cutting edge of the upper portion of the knife or cutter. The slide 43, which is curved in cross section, is provided at its outer end with opposite upwardly extending arms or attached portions 45, which are slotted at 46 to receive bolts 47 for securing the outer slide 43 to the bars 34 at the desired vertical adjustment.

When the reciprocatory bars move outward, the knife or cutter severs the potato in half and cuts the lower half into quarters, and on the inward movement of the knife, the outer slide enters the upper slot 42 of the box or casing and supports the upper half of the potato, which drops upon the outer slide 43, and which is divided into quarters by the vertical portion 35 of the knife at the next succeeding outward movement thereof. The lower portion of the rectangular box or casing is divided into two compartments or spaces by means of a transverse partition 48, which receives two portions or quarters cut by the lower depending portion of the knife or cutter.

When it is desired to drop one quarter of a potato in each hill, the quarter or portion within one of the compartments is supported and retained therein during the outward movement of the knife or cutter by an inner slide 49, extending through slots 50 and 51 of the transverse portion 37$^a$ of the hanger and the inner wall of the box or casing 36. The slide, which consists of a horizontal blade, is provided at its inner end with an upwardly extending arm 52, which is secured to one of the reciprocatory bars 34. When the knife or cutter is at the limit of its outward movement, one of the spaces or compartments of the box or casing 36 is open, and the other is closed at the bottom by the slide 49. This construction permits one quarter of a potato to be dropped at each outward movement of the knife or cutter, and as the inner slide 49 is withdrawn by the inward movement of the knife or cutter, a second quarter is dropped during such inward movement.

When it is desired to drop two portions of a potato in each hill, the inner slide 49 is detached by removing the bolt 53, which secures the inner slide to the front of the transverse bar 34. When the substantially T-shaped knife or cutter 33 is employed for dividing a potato into quarters, a quarter is dropped during both the inward and outward movements of the knife or cutter, but the cutting is affected only by the outward movement. The substantially T-shaped knife is detachably secured to the reciprocatable bars by bolts or other suitable fastening devices, and if desired, the T-shaped knife may be detached to permit a knife to be employed for cutting the potatoes into halves. When such knife is employed, the partition 48 of the box will also be removed and one-half of a potato will be dropped at each movement of the reciprocatable support formed by the bars 34.

In order to prevent a potato from adhering to the outer slide, a kicker 54, see Figs. 7 and 10 is employed. The kicker 54 consists of a bell crank lever composed of a pair of arms and fulcrumed at its angle on the hanger 37 by a bolt 55 or other suitable fastening device. The inner arm of the kicker is provided with a depending substantially quadrant-shaped lug or flange 56 for engaging a potato, and the outer arm is provided with an upwardly extending pin 57, which is arranged in the path of a pair of resilient cams 58 and 59. The cam 58 consists of a substantially semi-circular spring secured at one end to one of the reciprocatable bars 34 and presenting a curved face to the pin 57 for swinging the kicker outward. The other cam 59 consists of a spring extending longitudinally of and spaced from the adjacent bar 34, and having a curved terminal portion located close to and spaced from the cam 58 and arranged to engage the pin 57 for moving the kicker inward. The other end 60 of the resilient cam 59 is angularly bent and is secured to the bar 34. The kicker dislodges the potato should it adhere to the outer slide as the same leaves the box or casing 36. As the inner slide is withdrawn through a slot in the inner wall of the box or casing 36, the potato is positively discharged from such slide. The reciprocatable bars are also connected by a central plate or piece 61, having a depending pivot 62, which is arranged in a slot 63 of a longitudinally disposed vibratory lever 64, fulcrumed at an intermediate point and having its rear end engaged by a cam wheel 65. The lever 64 is mounted on a cone bearing 66, which is secured to a transverse bar 67, and which is supported by a transverse brace 68, secured to the bar 67 at the central portion thereof. The cam wheel is provided with a peripherally arranged camway 69, extending back and forth over the periphery of the cam wheel and from one side of the same to the other and formed by detachable flanges 70, having outwardly extending perforated attachment portions for the reception of bolts or other suitable fastening devices for securing the flanges to the periphery of the wheel. The flanges are adapted to be detached to enable other flanges to be secured to the wheel to vary the rapidity of the reciprocation of the vibratory lever 64 for controlling the speed of the cutting and dropping mechanism and to regulate the distance between the hills. The cam wheel is suitably secured to the transverse shaft or axle, and it is provided with a clutch face or member $69^a$, which is engaged by a slidable spring actuated clutch or member $70^a$, mounted on the shaft or axle and engaged by a key or feather 71. When the slidable clutch section is in engagement with the clutch section or face of the cam wheel, motion will be communicated from the axle to the cutting and dropping mechanism. The slidable clutch section is provided with a groove, and is engaged by a forked front end 72 of a shifting lever 73, which is fulcrumed at 74 on a bracket or support 75, and which has its rear end 76 arranged to be engaged by an inclined operating lever $76^a$, fulcrumed at its lower end 77 on the supporting frame of the machine and having a lower short upright portion for engaging the shifting lever. The upper portion of the operating lever is inclined and is arranged within easy reach of the operator. When the operating lever is swung to the right from the position shown in Fig. 4 of the drawings, the shifting lever will carry the sliding clutch section $70^a$ out of engagement with the clutch section or face of the cam wheel, and thereby stop the cutting and dropping mechanism. As soon as the operating lever 76 is released, the coiled spring 78 will move the slidable clutch section toward the cam wheel and carry it into engagement with the clutch face or section thereof.

The potatoes drop from the box or casing 36 into a tube 79, which delivers the potatoes between an upper pair of wings 80, and the latter are located above the sides or wings 81 of a furrow opener 82. The machine is provided at its front with a pair of furrow openers, which are in the form of curved runners, and which are secured at their front ends to a transverse bar 83. The wings 80, which are connected at their front ends, are provided with an arm or shank 84, which has its upper end forked and which is secured to a transverse bar 85. The transverse bar 85, which is located in rear of the transverse bar 83, is rigid with the same, and is connected with the said bar 83 by substantially V-shaped braces 86. The bars 83 and 85 are centrally secured to the rear portion of a draft beam or tongue $86^a$, and a longitudinally disposed bar 87 is secured at its front portion to the transverse bars 83 and 85. The bar 87 extends in rear of the draft beam or tongue and forms an arm, which is connected by a link 88 with an arm 89 of a transverse rock-shaft 90. The transverse rock-shaft 90, which is journaled in suitable bearings of the main or supporting frame of the machine, is provided at one side of the same with an upwardly extending operating arm or lever 91, terminating in a grip or handle, as clearly shown in Fig. 2 of the drawings. The operating arm or lever 91 is provided with a spring-actuated dog or detent 92, arranged to engage a toothed segment 93 controlled by a latch lever 94 arranged adjacent to the handle or grip of the operating arm or lever 92. The toothed segment is suitably secured to the adjacent side bar of the main or supporting frame of the machine. The front end portions 95 of the side bars of the main or supporting frame are depressed substantially semi-circular and extend downward, as clearly shown in Figs. 2 and 3, and the front ends of the curved portions are pivoted by bolts 96 to eyes 97 of the front transverse bar 83. By this construction, the furrow openers are pivotally connected with the front of the main or supporting frame, and are adapted to be raised or lowered to arrange the machine either for traveling or planting. When the furrow openers are raised from the ground, the wings 80 and the tube 79 are also carried upward, and the tube is of sufficient size to receive and clear the depending box or casing 36. The toothed segment and the spring actuated detent of the operating arm or lever of the rock-shaft locks the furrow openers in their adjustment.

Having thus fully described my invention, what I claim as new, and desire to secure by Letters Patent, is:—

1. In a machine of the class described, the combination of a main hopper provided with lateral outlets, conveyers located at opposite sides of the main hopper and extending from the said outlets, front hoppers arranged to receive from the conveyers the material to be planted, and mechanism arranged at the front hoppers for controlling the discharge of the material.

2. In a machine of the class described, the combination with front hoppers and dropping mechanism, of a main hopper having outlets, and conveyers extending from the outlets for delivering the material to the front hoppers.

3. In a machine of the class described, the combination with front hoppers and dropping mechanism, of a main hopper having lateral outlets, side hoppers located at the said outlets, and conveyers extending from the said side hoppers to the front hoppers.

4. In a machine of the class described, the combination with front hoppers, and dropping mechanism, of a main hopper having lateral outlets and provided with an oppositely inclined bottom for directing the contents of the main hopper to the said outlets, rear side hoppers located at the outlets, and means for conveying the material from the rear hoppers to the front hoppers.

5. In a machine of the class described, the combination with front hoppers, and dropping mechanism, of a main hopper located in rear of the front hoppers and provided with outlets, rear side hoppers located at the outlets, inclined endless conveyers extending from the rear hoppers to the front hoppers, and inclined conveyer frames or casings receiving the upper stretches of the endless conveyers.

6. In a machine of the class described, the combination with front hoppers, and dropping mechanism, of a main hopper located in rear of the front hoppers and having outlets, rear side hoppers located at the outlets, and inclined endless conveyers extending from the rear hoppers to the front hoppers and provided with hook-shaped carriers.

7. In a machine of the class described, the combination with front hoppers, and dropping mechanism, of a main hopper located in rear of the front hoppers and having outlets, rear side hoppers located at the outlets, and inclined endless conveyers extending from the rear hoppers to the front hoppers and provided with hook-shaped carriers having a plurality of spaced tines or fingers.

8. In a machine of the class described, the combination with front hoppers, and dropping mechanism, of rear hoppers, inclined conveyers extending from the rear hoppers, and chutes arranged to receive the contents of the conveyers for delivering the same to the front hoppers.

9. In a machine of the class described, the combination with front hoppers, and dropping mechanism, of a main hopper located in rear of the front hoppers and provided with lateral outlets, rear side hoppers arranged at the outlets, inclined conveyers extending forward from the rear hoppers, and chutes arranged to receive the contents of the conveyers for delivering the same into the front hoppers.

10. In a machine of the class described, the combination of a main hopper, rear side hoppers, conveyers extending forwardly from the rear side hoppers, front hoppers, laterally reciprocatable knives for cutting the potatoes, and means for controlling the discharge of the severed portions of the potatoes.

11. In a machine of the class described, the combination of a hopper provided with interiorly arranged resilient supports arranged to hold a potato, a horizontally reciprocatable knife located below the supports and movable through the hopper for cutting the potato, and means for operating the knife.

12. In a machine of the class described, the combination of a hopper, a series of springs arranged within the hopper and having downwardly converging portions arranged to support a potato, a horizontally reciprocatable knife or cutter located below the support, and means for operating the knife or cutter.

13. In a machine of the class described, the combination of a series of downwardly converging springs, secured at their upper ends within the hopper and having lower free ends forming a yieldable support for a potato and arranged to center the same within the hopper, a knife or cutter located below the springs and movable through the hopper, and means for operating the knife or cutter.

14. In a machine of the class described, the combination of a hopper, a reciprocatable substantially T-shaped knife arranged to divide a potato into halves and to simultaneously cut one of such halves into quarters, and means for supporting the undivided half of the potato and for successively dropping the quarters of the divided half.

15. In a machine of the class described, the combination of a hopper, a reciprocatable knife having approximately horizontally and vertically disposed portions for dividing a potato into halves and for cutting one of the halves into quarters, and opposite slides movable with the knife and arranged to support the undivided half of the potato and one of the quarters.

16. In a machine of the class described, the combination of a hopper, a knife having approximately horizontal and vertical portions, and inner and outer supporting means movable with a knife and arranged to receive portions of a potato, whereby the cut portions of a potato will be dropped at intervals.

17. In a machine of the class described, the combination of a hopper, a reciprocatable knife provided with means for cutting a potato in half and for simultaneously dividing one of the halves of the same, an outer slide located beyond the knife and movable with the same for supporting the undivided half of the potato, and an inner slide located below the knife and movable with the same for supporting a portion of the divided half of the potato.

18. In a machine of the class described, the combination of a hopper, a casing located beneath the hopper and provided with separate compartments, a reciprocatable knife provided with means for cutting a potato in half and for dividing one of the halves into quarters, an upper slide arranged to support the undivided half of the potato, and a lower slide operating below the knife and movable into and out of one of the compartments of the casing for supporting one of the portions of the divided half of the potato.

19. In a machine of the class described, the combination of a hopper, a knife for cutting a potato, a support movable with the knife and arranged to receive a portion of the potato, and means for positively dislodging such portion of the potato from the support.

20. In a machine of the class described, the combination of a hopper, a knife for cutting a potato, a support movable with the knife and arranged to receive a portion of the potato, and an automatically operable kicker for positively dislodging the potato from the support.

21. In a machine of the class described, the combination of a hopper, a knife for cutting a potato, a support movable with the knife and arranged to receive a portion of the potato, a pivotally mounted kicker having an arm arranged to dislodge a potato from the said support, and means for automatically oscillating the kicker.

22. In a machine of the class described, the combination of a hopper, a reciprocatable knife for dividing a potato, a support movable with the knife for holding a portion of the potato, a pivotally mounted kicker arranged to dislodge the potato from the support, and reciprocatable means movable with the knife for automatically operating the kicker.

23. In a machine of the class described, the combination of a hopper, a reciprocatable knife for dividing a potato, a support movable with the knife for holding a portion of the potato, a pivotally mounted kicker arranged to dislodge the potato from the support, and reciprocatable cams movable with the knife for automatically operating the kicker 24. In a machine of the class described, the combination of a hopper, a reciprocatable knife for dividing a potato, a support movable with the knife and arranged to hold a portion of the potato, a pivotally mounted kicker arranged to dislodge the potato from the support and provided with a projecting portion, a substantially semi-circular cam arranged to engage the projecting portion for moving the kicker in one direction, and a cam spaced from the said cam and curved to move the projecting portion of the kicker in the opposite direction.

25. In a machine of the class described, the combination of a hopper, a reciprocatable knife for dividing a potato, a support movable with the knife and arranged to hold a portion of the potato, a pivotally mounted kicker consisting of a lever having opposite arms, one of the arms being provided with a pin, a substantially semi-circular cam movable with the knife and arranged to engage the pin to swing the kicker in one direction, and a spring also movable with the knife and secured at one end, the other end of the spring being free and curved to engage the pin.

26. In a machine of the class described, the combination of a hopper, a hanger secured to the hopper and having spaced sides, a box or casing supported by the hanger and located beneath the hopper and spaced from the same, a reciprocatable knife operating in the space between the hopper and the casing, a slide spaced from the knife and also operating in the space between the hopper and the casing, and means for operating the slide.

27. In a machine of the class described, the combination of a hopper, a casing located beneath and supported by the hopper, reciprocatable bars, a knife carried by the reciprocatable bars and operating in the space between the hopper and the casing, and a slide also mounted on the bars and carried by the same.

28. In a machine of the class described, the combination of a hopper, a casing located beneath and supported by the hopper, reciprocatable bars, a knife carried by the reciprocatable bars and operating in the space between the hopper, and the casing and a slide provided with opposite arms adjustably secured to the reciprocatable bars.

29. In a machine of the class described, the combination of a hopper, a reciprocatable knife, a slide movable with the knife and curved in cross section, and an automatically operable kicker provided with a flange or lug having a curved edge arranged contiguous to the slide.

30. In a machine of the class described, the combination of opposite hoppers, reciprocatable bars, knives carried by the bars, an oscillatory lever connected with the bars, and a cam wheel provided with detachable cam flanges arranged in spaced relation to receive the said lever and adapted to be detached to permit other flanges to be used for varying the movement of the lever.

31. In a machine of the class described, the combination of a main frame, a movable frame pivotally connected with the main frame at the front of the machine and provided with a centrally arranged rearwardly extending inclined arm, a draft beam or pole fixed to the movable frame furrow openers carried by the movable frame, a rock-shaft having an arm, a link connected with the arm of the rock-shaft, and means for adjusting the rock-shaft.

32. In a machine of the class described, the combination of a main frame provided with side bars having forwardly projecting depressed portions, a movable frame provided with runners and hinged at its front to the front end of the forwardly projecting depressed portions of the said side bars, a draft beam or pole fixed to the movable frame, a longitudinal bar secured at its front portion to the movable frame at a point beneath the draft beam or pole and extending rearwardly from the said movable frame, and operating mechanism mounted on the main frame and connected with the rear end of the longitudinal bar.

In testimony, that I claim the foregoing as my own, I have hereto affixed my signature in the presence of two witnesses.

JOHN J. PUTNEY.

Witnesses:
H. W. MOBERLY,
JOHN BALL.